US012345606B2

(12) United States Patent
Okamoto et al.

(10) Patent No.: US 12,345,606 B2
(45) Date of Patent: Jul. 1, 2025

(54) OMNIDIRECTIONAL SOFT CAPACITIVE TACTILE SENSORS, AND METHODS OF USING THE SAME

(71) Applicant: MASSACHUSETTS INSTITUTE OF TECHNOLOGY, Cambridge, MA (US)

(72) Inventors: Tyler T. Okamoto, Newcastle, WA (US); Kamal Youcef-Toumi, Cambridge, MA (US); Jiyoung Chang, Boston, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 326 days.

(21) Appl. No.: 17/788,468

(22) PCT Filed: Dec. 23, 2020

(86) PCT No.: PCT/US2020/066881
§ 371 (c)(1),
(2) Date: Jun. 23, 2022

(87) PCT Pub. No.: WO2021/133934
PCT Pub. Date: Jul. 1, 2021

(65) Prior Publication Data
US 2023/0043301 A1 Feb. 9, 2023

Related U.S. Application Data

(60) Provisional application No. 62/953,319, filed on Dec. 24, 2019.

(51) Int. Cl.
*G01M 3/00* (2006.01)
*G01L 1/14* (2006.01)
(Continued)

(52) U.S. Cl.
CPC .............. *G01M 3/005* (2013.01); *G01L 1/146* (2013.01); *G01L 5/165* (2013.01); *G01M 3/02* (2013.01)

(58) Field of Classification Search
CPC .......... G01M 3/02; G01M 3/005; G01M 3/16; G01M 3/027; G01M 3/18; G01L 1/146; G01L 1/142; G01L 1/14; G01L 5/165
See application file for complete search history.

(56) References Cited

U.S. PATENT DOCUMENTS

2002/0121146 A1   9/2002  Manaresi et al.
2012/0154288 A1*  6/2012  Walker .................. G06F 1/1677
                                                              345/169

(Continued)

OTHER PUBLICATIONS

PCT International Search Report and Written Opinion completed by the ISA/US on Feb. 28, 2021 and issued in connection with PCT/US2020/066881, date mailed Mar. 19, 2021.

*Primary Examiner* — Helen C Kwok
(74) *Attorney, Agent, or Firm* — Barnes & Thornburg LLP

(57) ABSTRACT

Composite sensors that exhibit four deformation modes decoupled from each other are disclosed. The modes include tension, compression, bending, and torsion. In one exemplary embodiment, the sensor includes a substrate and six unit sensors. The unit sensors are paired such that each pair includes two unit sensors disposed on opposite surfaces of the substrate, the sensors being substantially opposed to each other. Two of the pairs include longitudinal axes that are substantially parallel to each other, and the third pair includes a longitudinal axis that is substantially perpendicular to the other two longitudinal axes. The substrate is constrained along one of its edges. The composite sensors can be used in many contexts, such as part of a flow-driven, (Continued)

soft robot that passes through a pipe and detect links. Methods of detecting leaks are also described.

21 Claims, 7 Drawing Sheets

(51) Int. Cl.
*G01L 5/165* (2020.01)
*G01M 3/02* (2006.01)

(56) References Cited

U.S. PATENT DOCUMENTS

| | | |
|---|---|---|
| 2013/0168336 A1* | 7/2013 | Kim .................. G01L 1/205 29/527.1 |
| 2015/0035411 A1 | 2/2015 | Kawamura et al. |
| 2015/0105647 A1 | 4/2015 | Katra et al. |
| 2016/0015311 A1 | 1/2016 | Jiang |
| 2016/0097630 A1* | 4/2016 | Lombard ............. G01B 7/24 324/207.11 |
| 2019/0368664 A1 | 12/2019 | Yu et al. |
| 2020/0070354 A1* | 3/2020 | Nakayama ........... B25J 13/084 |
| 2020/0141824 A1* | 5/2020 | Li ....................... G06F 3/041 |

* cited by examiner

OMNIDIRECTIONAL SOFT CAPACITIVE TACTILE SENSORS, AND METHODS OF USING THE SAME

CROSS REFERENCE TO RELATED APPLICATIONS

This application is a U.S. national counterpart application of international application serial No. PCT/US2020/066881 filed Dec. 23, 2020, which claims priority to and the benefit of U.S. Provisional Patent Application No. 62/953,319, filed on Dec. 24, 2019, the disclosures of which are hereby expressly incorporated by reference in their entireties.

FIELD

The present disclosure relates to the sensors for use in leak detection, and more particularly relates to sensors that allow for four deformation modes to be decoupled: bending, compressive pressure, uniaxial tension, and torsion. Notably, although the present disclosure primarily describes the provided sensors in the context of use to detect leaks, the design and principles related to the sensors can be applied for use in other contexts beyond leak detection, such as wearable devices.

BACKGROUND

Soft robotics has a growing need for multi-axis tactile sensing. Flexible soft sensors have the ability to measure bending and surface contact pressure. Existing sensors, however, have limited capabilities at least because they cannot measure all of the different deformation modes a material or object can undergo when a force is applied to the material or object. Those modes include: bending, compressive pressure, uniaxial tension, and torsion. For example, most capacitive sensors in existence prior to the present disclosure can measure one or two of these modes, such as uniaxial tension (sometimes referred to as stretching) and/or bending, but not more, such as the four modes identified above. Accordingly, there exists a need for a more versatile sensor able to measure bending, pressure, tension, and torsion, which can, among other things, provide insight about the geometry of the object with which the sensor is interacting and can have further applications to monitor body movements in wearable devices, tactile sensing for robot skin, prehension in anthropomorphic hands, crawling robots, wearable health monitoring devices, and water pipe leak detection, among other uses.

Existing soft sensor transducers include resistive and piezoresistive sensors, magnetic sensors, inductive sensors, and capacitive sensors. Most of these methods have critical limitations that prevent them from working well in water pipes or other scenarios. For example, resistive and piezoresistive sensors exhibit large hysteresis, overshoot, and transient behaviors. By way of further examples, optical sensors have complex fabrication methods and limited maximum strain, magnetic sensors are prone to interference around ferromagnetic objects, and inductive sensors require complex signal processing and is difficult to miniaturize. However, capacitive sensors show linearity, high sensitivity, quick response times, and have a large dynamic range. Thus, it would be desirable to adapt capacitance-based fabric and silicone sensors to be able to decouple the four deformation modes identified above.

While there are many industries in which sensors that deliver upon the desired improvement of being able to decouple the four deformation modes identified above, industries that utilize liquid flow through conduits, such as water in pipes, represent one particular sector that would benefit. USA municipalities lose approximately 15% to 25% of its water supply, with most of the losses being attributed to leakages. Current leak sensing technologies typically require the pipe to be dry to be inspected, resulting in the loss of service for the users. This includes robotic inspection, in which a tethered mobile system would inspect the pipe using acoustic or optical methods. This method requires a skilled technician to maneuver the robot. There exist other untethered passive devices like the Smartball, which uses acoustic instruments to inspect active water pipes without a human operator, but only work in large metal pipes and requires a specialist to interpret the data. Finally, there are out-of-pipe methods that detect leaks via acoustic signals, or by installing leak noise correlators around a suspected leak. However, the acoustic method is slow and requires tracing the pipeline manually, and leak noise correlators are not effective in plastic pipes.

Soft sensors offer a way to do in-situ leak detection in active water pipes. One sensing technology involves using piezoresistive rubber to measure the strain of a thin, flexible membrane as it is pulled by a leak. Leaks in a water or gas pipe cause a localized pressure gradient near the interior surface of the leak.

While the aforementioned sensing technology that uses piezoresistive rubber in an in-situ manner can detect the presence of a leak, it can have difficulty differentiating leaks from obstacles and other pipe features, resulting in false positives. This is due, at least in part, to the conductive silicone composite (CSC) sensors used in such technology having a transient response between approximately 9% to 13.8% of the steady-state behavior, variance over repeated trials of approximately 2.37% to 2.48%, a slow time constant of approximately 12 seconds to 19 seconds, and a hysteresis width of approximately 17% to 26%. These side effects make it difficult to calculate the forces acting on the sensor, especially when leaks are typically passed over in under 0.2 seconds. With the CSC sensor, leaks, obstacles, and pipe bends can all cause the sensor to respond, so sensor fusion with the accelerometer and gyro is needed to determine if the sensor fluctuation was also coupled with a pipe joint. Accordingly, there exists a need for sensors and/or robots that are able to better differentiate leaks from obstacles and other pipe features, preferably limiting the number of sensors used in such contexts, i.e., avoiding the use of additional sensors to help make such differentiations and determinations.

SUMMARY

Soft robots have many unique geometries requiring different tactile feedback mechanisms. In order to respond to their environment, soft robots would benefit by having multi-axis sensors that can determine how a surface is being contacted. As a particular application, current soft sensor designs are used to detect leaks in active water pipes, but have difficulty differentiating leaks from pipe joints and obstacles because multiple deformation modes cause the sensor to respond similarly.

The present disclosure provides for the design and fabrication of soft, multi-axis deformation sensors. The sensors provided for are omnidirectional. Highly flexible conductive fabric and silicone capacitors can be used as the capacitance sensing element, which can be arranged to decouple the four deformation modes of the material: uniaxial tension (i.e., stretching), bending, compressive pressure, and torsion. Furthermore, the disclosed sensors are well-suited for the detection of leaks, obstacles, and pipe joints in active water pipes, among other uses provided for herein or otherwise derivable in view of the present disclosures.

More particularly, by arranging an array of capacitive sensors in the manners provided for herein, or otherwise derivable from the present disclosures, and bonding the array to a silicone sheet or the like, it is possible to measure and decouple four modes of deformation: uniaxial tension, bending, pressure, and torsion. Given the performance characteristics of the resulting composite sensor, it is well-suited for underwater systems to monitor the leaks in pipes, and differentiate leaks from the obstacles and pipe joints that an inspection robot may encounter, among other applications. Notably, the sensors provided for herein can differentiate between four deformation modes such that additional sensors are not required.

The present disclosure provides for an array of capacitive-based, soft fabric sensors. These sensors demonstrate linearity and can be used to decouple the effects of uniaxial strain, bending, torsion, and pressure. By combining these decoupled signals, the resulting composite sensors offer a more reliable approach to characterize not only leaks, but also obstacles, pipe joints, and bends. As described herein, other uses beyond leak detection in pipes and the like are also made possible by the composite sensors designs that are described.

One exemplary embodiment of a composite sensor includes a substrate and six unit sensors. The substrate has opposed first and second surfaces and is constrained along a first edge of the substrate. The first unit sensor is disposed on the first surface of the substrate and the second unit sensor is disposed on the second surface of the substrate, disposed substantially opposed to the first unit sensor. Likewise, the third unit sensor is disposed on the first surface of the substrate and the fourth unit sensor is disposed on the second surface of the substrate, substantially opposed to the third unit sensor. A longitudinal axis of the third unit sensor is substantially perpendicular to a longitudinal axis of the first unit sensor, and a longitudinal axis of the fourth unit sensor is substantially perpendicular to a longitudinal axis of the second unit sensor. Still further, the fifth unit sensor is disposed on the first surface of the substrate and the sixth unit sensor is disposed on the second surface of the substrate, substantially opposed to the fifth unit sensor. A longitudinal axis of the fifth sensor is substantially parallel to the longitudinal axis of the first unit sensor, and a longitudinal axis of the sixth sensor is substantially parallel to the longitudinal axis of the second unit sensor. The composite sensor exhibits four deformation modes that are decoupled from each other. These modes include: tension along an x-axis of the substrate, compressive force along a z-axis of the substrate, bending about a y-axis of the substrate, and torsion about the x-axis of the substrate.

At least one of the six unit sensors can include a capacitive sensor. In some instances, each of the six unit sensors can include a capacitive sensor. A capacitive sensor(s) can include a capacitive fabric sensor(s). In some embodiments, a capacitive fabric sensor(s) can include a dielectric layer having a first conductive fabric disposed on a first side of the dielectric layer and a second conductive fabric opposed to the first conductive fabric on a second opposed side of the dielectric layer.

The substrate can be substantially more elastic than each of the unit sensors. Many different configurations and shapes of substrates and sensors are possible. In at least some embodiments, a first midline of the substrate can substantially bisect a main body of each of the first, second, fifth, and sixth unit sensors and a second midline of the substrate can be substantially perpendicular to the first midline, the second midline substantially bisecting a main body of each of the third and fourth unit sensors. The main bodies of the first and second unit sensors can be disposed on one side of the second midline and the main bodies of the fifth and sixth sensors can be disposed on an opposite side of the second midline. In some embodiments, the substrate can have a substantially dogbone configuration.

One embodiment of a leak detection robot includes a soft body and at least one composite sensor that is coupled to and/or disposed on the soft body. The composite sensor includes a substrate having opposed first and second surfaces and four unit sensors. The first and third unit sensors are disposed on the first surface of the substrate and the second and fourth unit sensors are disposed on the second surface of the substrate. The second unit sensor is disposed substantially opposed to the first unit sensor and the fourth unit sensor is disposed substantially opposed to the third unit sensor. Further, a longitudinal axis of the third unit sensor is substantially perpendicular to a longitudinal axis of the first unit sensor and a longitudinal axis of the fourth unit sensor is substantially perpendicular to a longitudinal axis of the second unit sensor. The composite sensor exhibits four deformation modes: tension along an x-axis of the substrate, compressive force along a z-axis of the substrate, bending about a y-axis of the substrate, and torsion about the x-axis of the substrate.

At least one of the four unit sensors can include a capacitive sensor. In some instances, each of the four unit sensors can include a capacitive sensor. A capacitive sensor (s) can include a capacitive fabric sensor(s). In some embodiments, a capacitive fabric sensor(s) can include a dielectric layer having a first conductive fabric disposed on a first side of the dielectric layer and a second conductive fabric opposed to the first conductive fabric on a second opposed side of the dielectric layer.

The four deformation modes can be decoupled from each other. In some embodiments, the robot can include a firth unit sensor and a sixth unit sensor. The fifth unit sensor can be disposed on the first surface of the substrate and the sixth unit sensor can be disposed on the second surface of the substrate, substantially opposed to the firth unit sensor. A longitudinal axis of the sixth unit sensor can be substantially parallel to the longitudinal axis of the second unit sensor.

The substrate can be substantially more elastic than each of the unit sensors. Many different configurations and shapes of substrates and sensors are possible. In at least some embodiments in which six unit sensors are used, a first midline of the substrate can substantially bisect a main body of each of the first, second, fifth, and sixth unit sensors and a second midline of the substrate can be substantially perpendicular to the first midline, the second midline substantially bisecting a main body of each of the third and fourth unit sensors. The main bodies of the first and second unit sensors can be disposed on one side of the second midline and the main bodies of the fifth and sixth sensors can be disposed on an opposite side of the second midline. In some embodiments, the substrate can have a substantially dogbone configuration. The robot can include an end cap that can be coupled to the soft body.

One method for detecting leaks includes disposing a flow-driven robot into a pipe, with the flow-driven robot having at least one composite sensor for detecting leaks. The method includes measuring tension along an x-axis of the composite sensor, measuring compressive force along a z-axis of the composite sensor, measuring bending about a y-axis of the composite sensor, and measuring torsion about the x-axis of the composite sensor. Still further, the method includes determining an existence of a leak in the pipe based on at least one of the measured tension, the compressive force, the bending, and the torsion. Each of the measured tension, compressive force, bending, and torsion are decoupled from each other.

The composite sensor can be constrained along a first edge of the sensor. The composite sensor can include any of the composite sensors described within the claims and/or the description of the present application and/or derivable from the claims or the description of the present application. Likewise, the flow-driven robot can include any of the robots described in or derivable from the present application.

BRIEF DESCRIPTION OF DRAWINGS

This disclosure will be more fully understood from the following detailed description taken in conjunction with the accompanying drawings, in which.

DETAILED DESCRIPTION

Certain illustrative embodiments will now be described to provide an overall understanding of the principles of the structure, function, manufacture, and use of the devices and methods disclosed herein. One or more examples of these embodiments are illustrated in the accompanying drawings. Those skilled in the art will understand that the devices and methods specifically described herein and illustrated in the accompanying drawings are non-limiting exemplary embodiments and that the scope of the present disclosure is defined solely by the claims. The features illustrated or described in connection with one exemplary embodiment may be combined with the features of other embodiments.

Such modifications and variations are intended to be included within the scope of the present disclosure. Further, to the extent features, sides, objects, sensors, steps, or the like are described as being "first," "second," "third," etc., such numerical ordering is generally arbitrary, and thus such numbering can be interchangeable. Still further, the present disclosure includes some illustrations and descriptions that include prototypes or bench models. A person skilled in the art will recognize how to rely upon the present disclosure to integrate the techniques, systems, devices, and methods provided for into a product, such as a flow-driven robot for use in detecting a leak in a pipe.

The present disclosure generally provides for a single composite sensor that can measure four modes of deformation independent of each other: bending, compressive pressure, uniaxial tension, and torsion. The configuration of the sensor is such that the deformation modes are decoupled from each other, allowing for the different modes to be discernable from each other as one or more forces are experienced by the sensor. In some embodiments, the composite sensor can include a series of sensor pairs, such as four sensors in two pairs or six sensors in three pairs, the pairs being sensors that are opposed to each other on opposite sides of a substrate or plate. More particularly, the sensor design in some embodiments can involve creating a plurality of unit sensors and bonding them to a flexible rubber substrate to form the composite sensor, where the term "composite" is used to describe a sensor made up of separate unit sensors and the term "unit" is used to describe a single sensor component (e.g., a single capacitive sensor).

Figure 1:
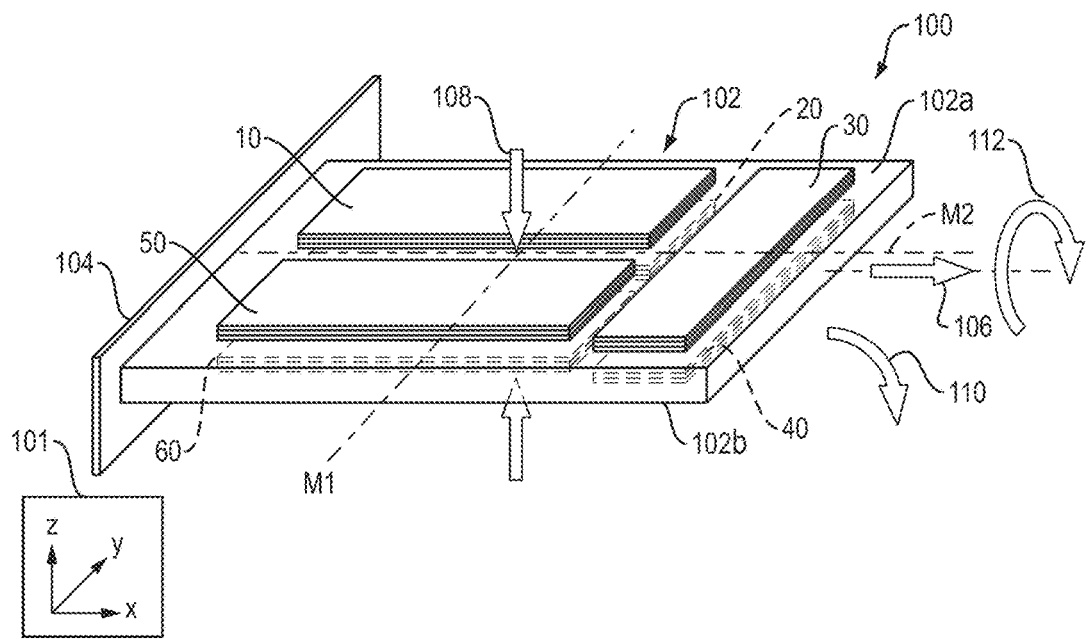
FIG. 1 is a perspective view of one exemplary embodiment of a composite sensor.

FIG. 1 illustrates one embodiment of a composite sensor 100 of the present disclosure that can detect and decouple the aforementioned four deformation modes. The sensor 100 can include a substrate 102 with six unit sensors 10, 20, 30, 40, 50, 60 coupled thereto. The substrate can have a first surface 102a, a second surface 102b opposite the first surface, and can be constrained along one edge. In the illustrated embodiment, the substrate 102 can be constrained along a left-most edge 104, when looking at the figure page in its intended orientation. In some embodiments, the constrained edge 104 can be securely attached to a robot (not shown). With reference to the coordinate system 101 as shown in FIG. 1, the sensor 100 can exhibit four deformation modes—tension along the x-axis 106, compressive pressure along the z-axis 108, bending about the y-axis 110, and torsion about the x-axis 112. The unit sensors 10, 20, 30, 40, 50, 60 can be disposed on the substrate 102 in a particular arrangement such that each of these four deformation modes can be detected and decoupled from one another.

A first unit sensor 10 can be disposed on the first surface of the substrate 102a. A second unit sensor 20 can disposed on the second surface 102b of the substrate, substantially opposed to the first unit sensor, i.e., the first and second unit sensors 10, 20 can be aligned along the x- and y-axes of the substrate 102. Similarly, a third unit sensor 30 and a fifth unit sensor 50 can be disposed on the first surface 102a of the substrate and a fourth unit sensor 40 and a sixth unit sensor 60 can be disposed on the second surface 102b of the substrate substantially opposed to the third and fifth unit sensors 30, 50, respectively. As discussed in detail below, a longitudinal axis of the first, fifth, second, and sixth unit sensors 10, 50, 20, 60, i.e., an axis that extends a length of the longest illustrated dimension between an illustrated length, width, and height of each unit sensor, can be substantially parallel to one another and substantially perpendicular to the longitudinal axis of the second and fourth unit sensors 10, 20. The unit sensors 10, 20, 30, 40, 50, 60 can be disposed on the substrate 102 such that a first midline M1 of the substrate can substantially bisect a main body of each of the first, second, fifth, and sixth unit sensors and a second midline M2 of the substrate substantially perpendicular to the first midline can substantially bisect a main body of each of the third and fourth unit sensors. The first and second unit sensors 10, 20 can be disposed on one side of the second midline M2 and the fifth and sixth unit sensors 50, 60 can be disposed on an opposite side of the second midline M2 from the first and second unit sensors.

While six-unit sensors 10, 20, 30, 40, 50, 60 are illustrated in the embodiment of FIG. 1, composite sensors of the present disclosure can have as few as four unit sensors, which can be sufficient for detection and decoupling of the four deformation modes. More particularly, in the illustrated configuration of FIG. 1, unit sensors 10, 20, 30, and 50 can be sufficient to detect and decouple the four deformation modes 106, 108, 110, 112, while unit sensors 40 and 60 can provide redundancy and structural benefits. Table 1, below, illustrates the unit sensor 10, 20, 30, 40, 50, 60 sensitivity responses to each deformation mode in the configuration shown and described with respect to the composite sensor 100 of FIG. 1.

TABLE 1

| Sensor # | Tension | Bending | Compression | Torsion |
|---|---|---|---|---|
| 1 | ++ | ++ | ++ | + |
| 2 | ++ | -- | ++ | + |
| 3 | + | + | ++ | 0 |
| (4) | + | - | ++ | 0 |
| 5 | ++ | ++ | ++ | + |
| (6) | ++ | -- | ++ | + |

In uniaxial tension 106, unit sensors 10, 20, 50, and 60 are subject to the most deformation, and thus exhibit the strongest response. Unit sensors 30 and 40 are oriented sideways (i.e., each having a longitudinal axis substantially parallel to the y-axis of the substrate), such that these unit sensors 30, 40 respond to the uniaxial tension 106, but to a lesser extent. In bending about the y-axis, as illustrated by arrow 110 in FIG. 1 (i.e., in a negative direction along the z-axis), the unit sensors 10, 30, and 50 bonded to the first surface 102a of the substrate 102 exhibit a positive response, with unit sensors 10 and 50 having the strongest positive responses. Conversely, the unit sensors 20, 40, and 60 bonded to the second surface 102b of the substrate 102 exhibit a negative response, with unit sensors 20 and 40 having the strongest negative responses. When the bending 110 occurs in the reverse direction, e.g., in a positive along the z-axis, the unit sensor 10, 20, 30, 40, 50, and 60 responses are also reversed (i.e., unit sensors 10, 30, and 50 exhibit a negative response and unit sensors 20, 40, and 60 exhibit a positive response). In uniform compression 108, all six unit sensors 10, 20, 30, 40, 50, and 60 are subject to the same strain, so each exhibits the same positive response. In torsion 112, the unit sensors located off-axis form the axis of rotation show a positive response, namely sensors 10, 20, 50, and 60. The unit sensors that cross the axis of rotation, e.g., unit sensors 30 and 40, show no response. Using the above-described sensitivity vectors from unit sensors, the four modes of deformation can be decoupled.

Figure 2A:
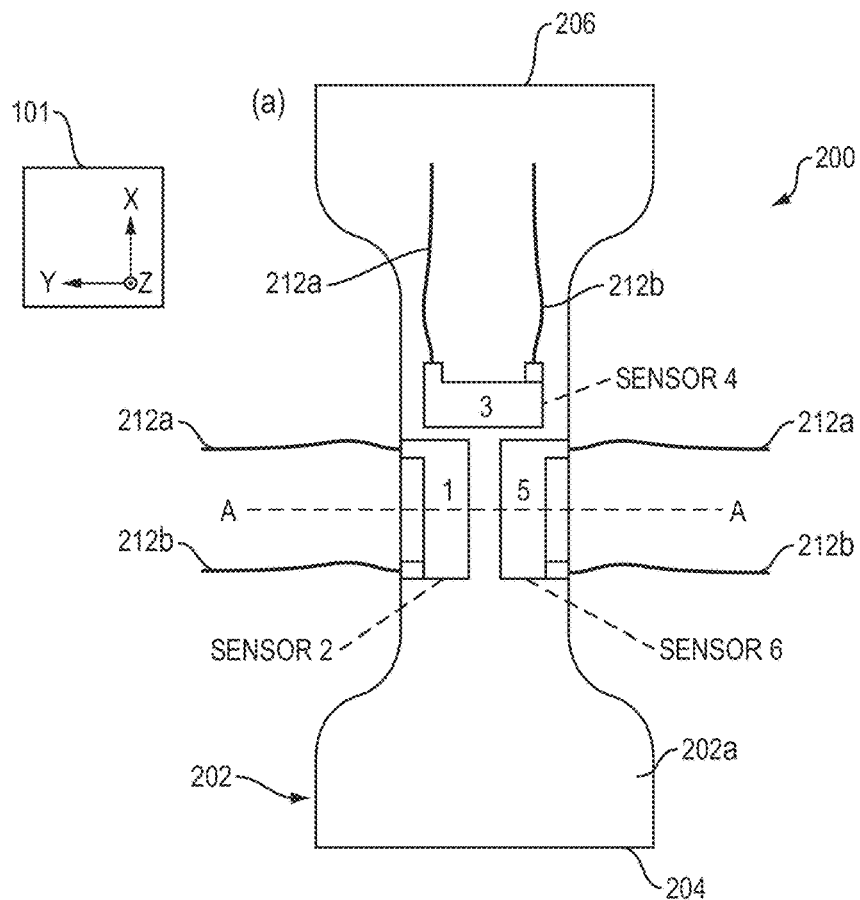
FIG. 2A is a top view of another exemplary embodiment of a composite sensor.
Figure 2B:
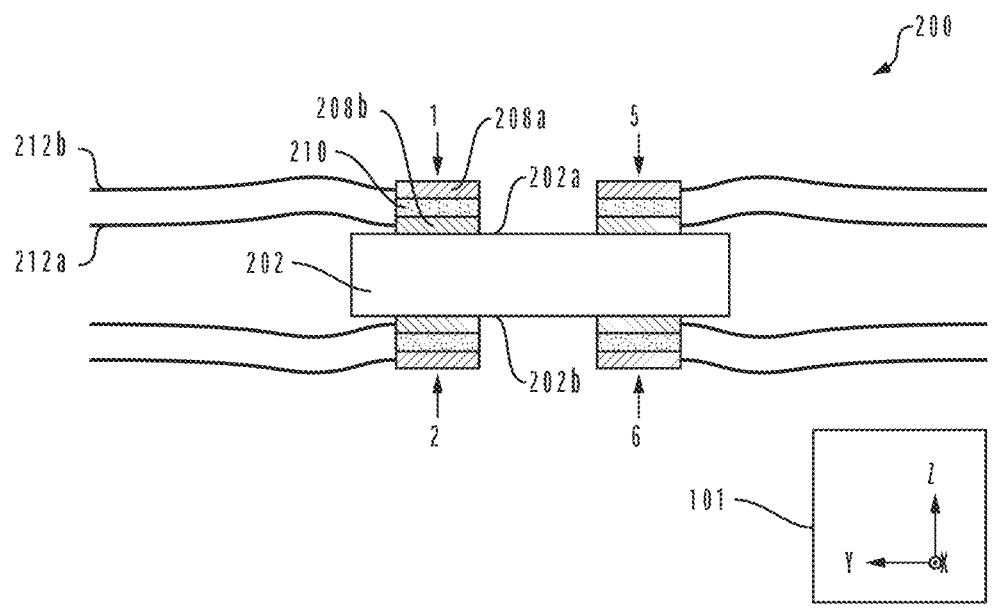
FIG. 2B is a cross-sectional view of the composite sensor of FIG. 2A taken along line A-A.

FIGS. 2A and 2B illustrate another embodiment of a composite sensor 200 of the present disclosure, which can include a substrate 202 and six unit sensors 1, 2, 3, 4, 5, 6 that can be arranged on the substrate in a configuration similar to that described above with respect to FIG. 1. FIG. 2A shows a top-down view of the composite sensor 200 and FIG. 2B shows a cross-sectional view of the composite sensor taken along the line A-A of FIG. 2A. In some embodiments, the substrate 200 can be a rubber substrate in a "dogbone" shape with a first surface 202a and a second surface 202b opposite the first. Unit sensors 1, 3, and 5 can be disposed on the first surface 202a of the substrate. Unit sensors 2, 4, and 6 can be disposed on the second surface 202b, substantially opposed to unit sensors 1, 3, and 5, respectively. While not shown, the composite sensor 200 can be constrained along one edge of the substrate 202, e.g., along a first or second edge 204 or 206 extending along the y-axis such that the composite sensor 200 can exhibit the four deformation modes discussed above with respect to FIG. 1. As shown in FIG. 2B, in one embodiment each unit sensor 1, 2, 5, and 6 can include two highly conductive fabric sheets 208a, 208b that can be bonded to either side of a silicone dielectric film 210 to form a capacitor that can form the unit sensor. Unit sensors 3 and 4 can be similarly formed to the unit sensors illustrated and described in FIG. 2B. Wiring 212a, 212b can extend from each unit sensor 1, 2, 3, 4, 5, and 6 to transmit the unit sensor response to a connected electronic device. Both the fabric sheets 208a, 208b and the silicone dielectric 210 can be substantially less elastic than the substrate 202, which can be formed from a bulk elastomer.

Figure 3A:
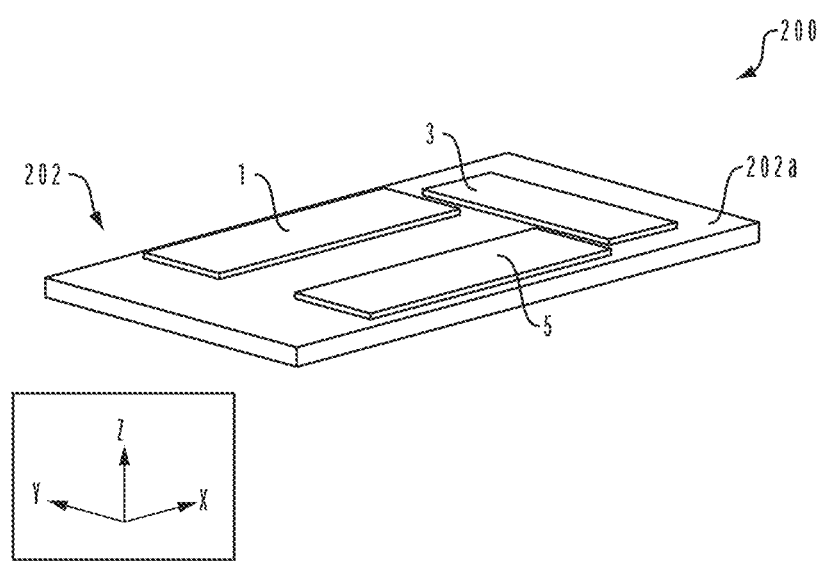
FIG. 3A is a perspective view of the composite sensor of FIG. 2A.
Figure 3B:
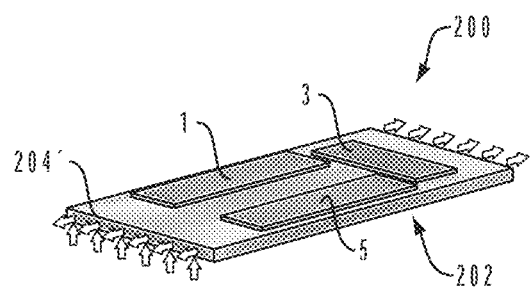
FIGS. 3B-3G are schematic perspective views of the composite sensor of FIG. 3A exhibiting various deformation modes.
Figure 3C:
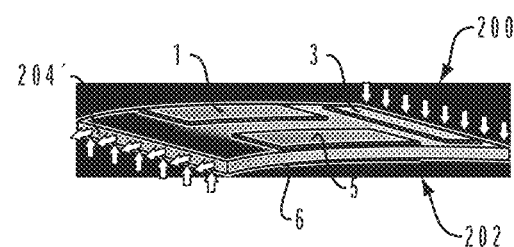
Figure 3D:
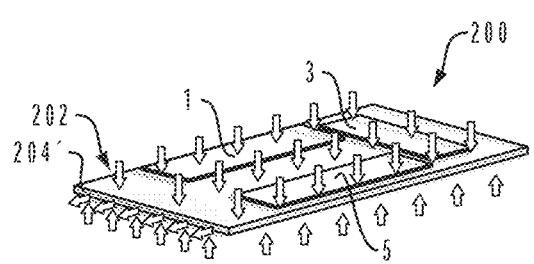
Figure 3E:
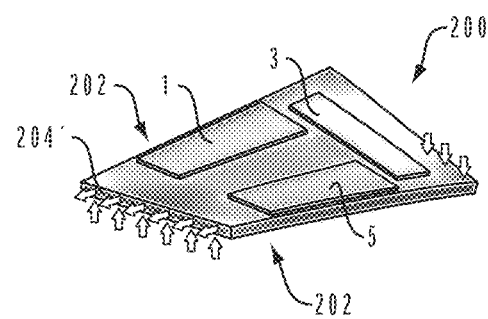
Figure 3F:
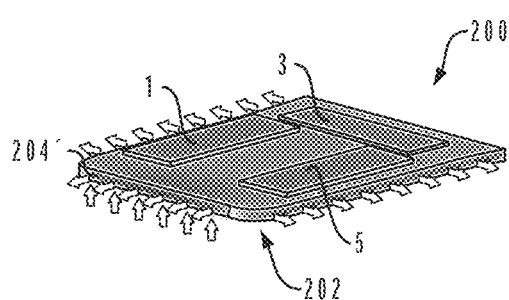
Figure 3G:
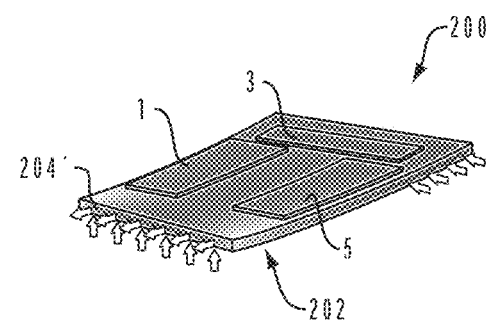

A perspective view of a portion of the composite sensor of FIG. 2A containing the unit sensors 1, 2, 3, 4, 5, 6 is illustrated in FIG. 3A, with various deformation modes of the composite sensor being illustrated in FIGS. 3B-3G. As the geometry of the composite sensor 200 is a substrate 202 that can be constrained along one edge, e.g., 204 or 206, the composite sensor 200 can exhibit four deformation modes: tension along the x-axis (FIG. 3B); bending about the y-axis (FIG. 3C); compressive pressure along the z-axis (FIG. 3D); and torsion about the x-axis (FIG. 3E). In addition to the strain distribution of the composite sensor 200 illustrated in FIGS. 3A-3D, FIGS. 3F and 3G show uniaxial tension on both faces 202a, 202b parallel to the y-axis (FIG. 3F), and bending around the z-axis (FIG. 3G). Because the composite sensor 200 cannot provide a reaction force along the y-axis it will not show up in the resulting response from the unit sensors 1, 2, 3, 4, 5, 6. Curving about the z-axis is very difficult compared to the other bending modes, so it will not be measured as it has negligible contribution to the strain. In the illustrated strain deformations of FIGS. 3B-3G, the sensor 200 can be constrained along the edge 204, as shown by the two sets of perpendicular fixed force arrows at edge 204' of the portion of substrate 202 illustrated in these figures. The color gradient of the sensor 200 in FIGS. 3B-3G, from darker shades to lighter shades, up to white, reflects the increasing magnitude of strain. Shades between images have different scales.

A person skilled in the art will recognize other configurations of a composite sensor are possible, with the designs being such that the four deformation modes can be decoupled from each other. The four deformation modes can be achieved, for example, by providing for at least four sensors to comprise the composite sensor. In the illustrated embodiment, six sensors are used to comprise the composite sensor, which can provide some redundancy that can be beneficial. More than six sensors can also be used, although often the inclusion of more than six sensors does not result in providing additional unique information.

In the illustrated embodiments of FIGS. 1A-3G, longitudinal axes that extend a length of the unit sensor 10, 1 and the unit sensor 50, 5 (i.e., the longest illustrated dimension between an illustrated length, width, and height of the unit sensor 10, 1 and the unite sensor 50, 5 in FIGS. 1-2B) can be substantially parallel to each other, and a longitudinal axis that extends a length of the unit sensor 30, 3 (i.e., the longest illustrated dimension between an illustrated length, width, and height of the sensor 30, 3 in FIGS. 1-2B) can be substantially parallel to the longitudinal axes of sensor 10, 1 and sensor 50, 5. Alternatively, one or more of these longitudinal axes may be disposed at a non-orthogonal angle with respect to the other axes and/or may not be substantially parallel to the other axes, although often times such configurations may not perform as well as the illustrated embodiment. Still further, while the illustrated embodiment of FIGS. 2A and 2B provides for a substrate that has dogbone shape, many other shapes of substrates can be used provided that such designs allow for the desirable sensor configurations disposed on such substrates. Additionally, the materials described with respect to the sensor in FIGS. 1-3G are non-limiting examples of the types of materials that can be used, and a person skilled in the art, in view of the present disclosure, will understand other materials that can be used to achieve similar and/or desirable results.

Unit Sensor Fabrication

FIGS. 4A-4E help illustrate one embodiment of a fabrication process for the composite and unit sensors disclosed herein. As discussed in greater detail below, the process can include an adhesion process to create a unit sensor of the present disclosure, such as those described above with respect to the composite sensors 100, 200 of FIGS. 1 and 2A.

Each unit sensor can be a capacitive sensor and can include two layers of highly conductive fabric that can sandwich a silicone film that acts as a dielectric. In general, the film can be created, and then the fabric can be adhered to either side of the film. The edges can be cut, for example, with a laser cutter to ensure repeatability.

The capacitance can be affected by at least four factors: the electrode area (A); the thickness of the dielectric (d); the dielectric permittivity of vacuum ($\varepsilon_0$); and the silicone dielectric permittivity. The capacitance of the unit sensor is modeled by the following equation:

$$C_{sensor} = \frac{\varepsilon_0 k A}{d} \quad (1)$$

It can be shown that if the Poisson's ratio of the fabric is equal to the Poisson's ratio of the dielectric, which is the case if the two materials are mechanically bonded, then the capacitance with respect to uniaxial strain $\varepsilon_x$ is as follows:

$$C_{sensor}(\varepsilon_x) = \varepsilon_0 k \frac{(1+\varepsilon_x) l_0 w_0}{d_0} \quad (2)$$

Because the textile can also have an effect on the bulk properties of the elastomer, each individual sensor may be more or less sensitive to uniaxial strain than predicted by this equation.

Figure 4A:
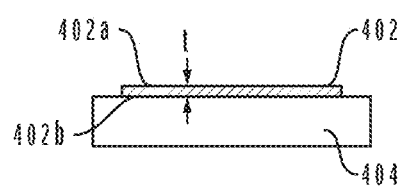
FIGS. 4A-4E schematically illustrate one exemplary embodiment of a fabrication process for fabricating a composite and/or unit sensor.

To create the film, a silicone layer, e.g., Ecoflex 00-30 (Smooth-on, Inc.), can be prepared. Materials like Ecoflex are dielectric. Other dielectric materials can also be used without departing from the spirit of the present disclosure. When using Ecoflex, preparation can be according to package instructions. With reference to FIG. 4A, a silicone layer 402 can be deposited as a layer or film with a thickness t of approximately 0.10 mm on a metal surface 404, such as an aluminum plate. This can be done, for instance, by using a thin film applicator. The thickness t of the silicone layer 402 can be measured as the distance between a first surface 402a and a second surface 402b opposite the first surface of the layer. The silicone layer 402 can be cured in an oven (e.g., Kenmore Elite 76771) at approximately 65.6° C. for approximately 20 minutes with air circulation. The resulting configuration is provided for in FIG. 4A.

A conductive layer can be prepared for use as one or more electrodes to be disposed on the silicone layer 402. More particularly, and with reference to FIG. 4B, a first conductive layer 406 and a second conductive layer 408 can be prepared for placement on the first and second surfaces 402a, 402b of the silicone layer 402, respectively. Each conductive layer 406, 408 can be made from a conductive fabric 410 cut into segments marginally larger than the intended size of the unit sensor, which is represented as a dotted outline 412 on each conductive fabric segment in FIG. 4B for reference. For example, the conductive fabric 410 can be a conductive silver-plated nylon fabric knit in double direction (e.g., 4900 Stretch Conductive Fabric, Holland Shielding, The Netherlands), which can be used as the electrodes. A piece of copper tape 414 with conductive adhesive (e.g., Kraftex, CA, USA) can be attached to the conductive fabric 410, which can be used to form tabs (424 of FIG. 4E). In some embodiments, each piece of copper tape 414 can be an approximately 6 mm by 6 mm square and approximately 2.54 cm thick. An adhesive layer of approximately 0.10 mm can be applied to the first surface 402a of the previously cured silicone layer 402, and the prepared first conductive layer 406, i.e., the electrode, can be overlaid on top of the adhesive layer. Air bubbles can be removed, for example through use of a metal roller. This unit can be cured in an oven (e.g., Kenmore Elite 76771) at approximately 65.6° C. for approximately 20 minutes. The first conductive layer 406 and the silicone layer 402 can be flipped over and air bubbles can again be removed.

A similar process can be used to provide the conductive layer 408, i.e., the electrode, on the second surface 402b of the silicone layer 402, i.e., the dielectric. Accordingly, an adhesive layer of approximately 0.10 mm can be applied on top of the second surface 402b of the silicone layer 402, and the second conductive layer 408 can be overlaid on top of the adhesive layer, approximately lining up with the conductive layer 406 on the first surface 402a of the silicone layer 402. Each conductive layer 406, 408 can be placed such that the copper tape pieces 414 are exposed when the conductive layers are adhered to the silicone layer 402, i.e., the copper tape pieces can face away from the dielectric.

Figure 4C:
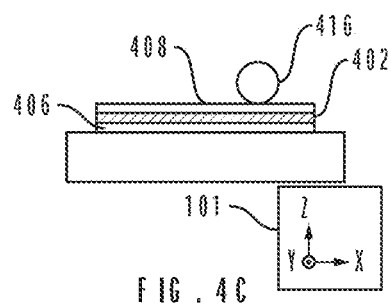
Figure 4B:
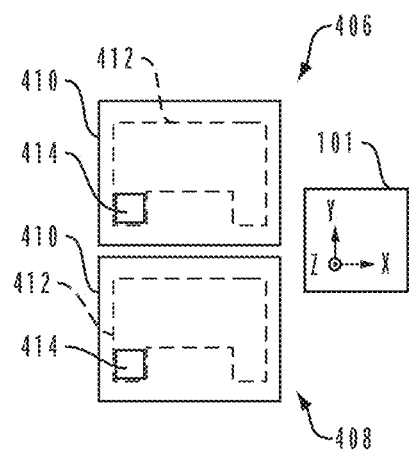

As shown in FIG. 4C, air bubbles can be removed from the second conductive layer 408, for example through use of a metal roller 416. Further, the roller 416 can ensure secure contact between the layers 408, 402. The silicone layer 402 dielectric with the conductive layers 406, 408 adhered thereto can be cured in the oven (e.g., Kenmore Elite 76771) with the same heat treatment as described above.

Figure 4D:
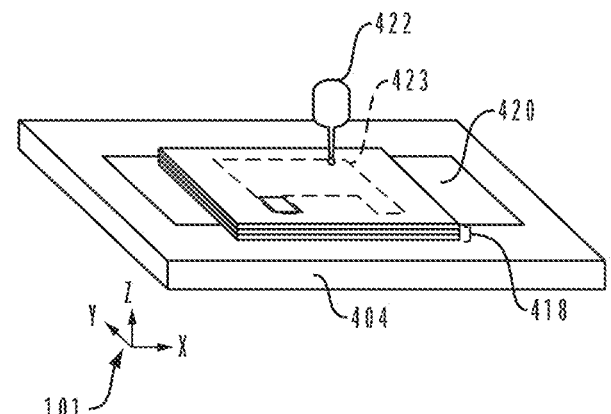
Figure 4E:
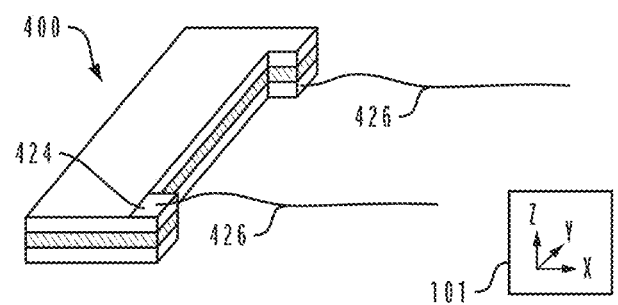

The cured conductive layers 406, 408 and silicone layer 402 can form a 3-layer sensor mat 418, as shown in FIG. 4D. To prepare for laser cutting, the 3-layer sensor mat 418 can be laid on a sheet of acrylic, and a piece of masking tape 420 can be applied to the top layer, e.g., the conductive layer 408 or 406, depending on orientation, to secure the 3-layer sensor mat 418 onto the aluminum plate 404. As shown in FIG. 4D, a laser cutter 422 (e.g., an Epilog laser cutter) can be used to cut the sensors along the sensor trajectory 423, for example with approximately 30% speed, approximately 50% power, and approximately 50% frequency. The laser cutter 422 can singe the edges of the sensor, i.e., along the sensor trajectory 423, which can mitigate the risk that the two fabric electrodes, i.e., conductive layers 406, 408, touch, which can happen when cutting a sensor with shears, for example. Additionally, the laser cutter 422 can provide more precise cuts that are not possible to achieve by hand. For example, tabs can be cut in the masking tape 420 such that the copper tape pieces 414 are exposed to form electrical connections 424 of the sensor. Further, 30 AWG wires (Flexible Silicone Wire, Striveday) can be soldered to the copper electrical connections 424. The fabric layer on the opposite side of the tab can be removed to eliminate the effect of the tabs on the capacitance of the sensor. The resulting, non-limiting exemplary embodiment of a unit sensor 400 of the present disclosure is illustrated in FIG. 4E, with wires 426 soldered to each of the two copper tape pieces 414. This same procedure, or other procedures that result in similarly performing sensors, can be used for all of the unit sensors of a composite sensor 100, 200, e.g., all six unit sensors illustrated in the composite sensors 100, 200 described herein, as well as with other sensors provided for herein or otherwise derivable from the present disclosures.

Composite Sensor Fabrication

To create a composite sensor of the present disclosure, multiple of unit sensors 400 can be arranged in a particular pattern on a substrate or the like, as described above. With reference to the composite sensor 200 illustrated in FIG. 2A, the substrate 202 can be a bulk elastomer that provides a physical structure to serve as a mounting plate for the unit sensors 1, 2, 3, 4, 5, 6 of the composite sensor. For example, in one exemplary embodiment, an approximately 1.5 mm thick layer of blue Mold Star 30 rubber (Smooth-On) in a dogbone shape can be created using a 3D printed mold (Fortus 250 mc, Stratasys) from acrylonitrile butadiene styrene (ABS), and cured in an oven (e.g., Kenmore Elite 76771) at approximately 65.6° C. for approximately 30 minutes. An approximately 0.2 mm layer of Mold Star 30 rubber can be spread on the middle section of the dogbone, and three capacitive unit sensors 1, 3, 5 can be placed on top of this adhesive layer, with the wires 212a, 212b going off to the side. For sensor 3, the electrical tabs of the sensor can be supported by a metal scaffold or the like so that it does not bond with the dogbone substrate 202. This can be cured in an oven (e.g., Kenmore Elite 76771) at approximately 65.6° C. for approximately 20 minutes. The composite sensor 200 can be flipped over, and sensors 2, 4, and 6 can be laid out. In some embodiments, the unit sensors 1, 2, 3, 4, 5, 6 can be arranged as described above with respect to FIG. 1, which can achieve the desired functionality of detecting and decoupling the four deformation forces.

Decoupling Methodology

By noting the baseline values and sensitivities of each of the six unit sensors to each of the four deformation modes, how much of each bending mode contributed to the overall capacitance change can be identified. Because each of the deformation modes causes a linear change in capacitance for a given contribution from each mode (strain for tension, curvature for bending, pressure for compression, and angle for torsion), linear algebra can be used to decouple each of the four deformations given six sensor readings. Below is a summary of the sensitivities each of the six unit sensors 1, 2, 3, 4, 5, 6 of the composite sensor 200 can experience in response to the four deformation modes:

TABLE I

SENSITIVITY TO DEFORMATION MODES

| Sensor No. | Deformation Mode ($\Delta C/C_0/x$) | | | |
| --- | --- | --- | --- | --- |
| | Uniaxial Tension ($x = \varepsilon$) | Bending ($x = \kappa$) | Compression ($x = $ Pa) | Torsion ($x = °$) |
| 1 | 1.594 | $3.16 \times 10^{-3}$ | $2.392 \times 10^{-6}$ | $1.63 \times 10^{-4}$ |
| 2 | 1.209 | $-1.73 \times 10^{-3}$ | $0.891 \times 10^{-6}$ | $0.944 \times 10^{-4}$ |
| 3 | 0.960 | $1.90 \times 10^{-3}$ | $0.760 \times 10^{-6}$ | $0.064 \times 10^{-4}$ |
| 4 | 0.752 | $-1.11 \times 10^{-3}$ | $1.875 \times 10^{-6}$ | $0.101 \times 10^{-4}$ |
| 5 | 1.796 | $2.96 \times 10^{-3}$ | $1.732 \times 10^{-6}$ | $2.23 \times 10^{-4}$ |
| 6 | 1.372 | $-1.78 \times 10^{-3}$ | $1.90 \times 10^{-3}$ | $0.760 \times 10^{-4}$ |

Let the data be sensitivity matrix, S, of dimensions 6×4. Let d be the deformation contributed by each mode (tension, bending, compression, and torsion), expressed as a 4×1 matrix. Let c be the relative capacitance change from the baseline capacitance of each sensor, expressed as a 6×1 matrix. Assuming that c is a superposition of the individual deformations, which is valid because of the local linearity of each of the modes for small deformations, c can be calculated if s and d are known.

$$S \cdot d = c \quad (4)$$

To decouple the individual strains by knowing the relative capacitance change, d can be solved for. Because S is a non-square matrix, but it is known that the columns of S are independent, the pseudo-inverse can be calculated:

$$S^+ = (S^T \cdot S)^{-1} \cdot S^T \quad (5)$$

Thus, $$d = S^+ \cdot c = (S^T \cdot S)^{-1} \cdot S^T \cdot c \quad (6)$$

Application to Leak Detection

The generalized deformation composite sensors described herein can be used in leak detection, as the composite sensors can be well suited to resolve differences between how the sensor is being deformed. As discussed previously, a leak in a pipe can cause positive uniaxial tension in the x-axis, and negative bending in the y-axis. Obstacles in the pipe cause positive bending in the y-axis, and possibly torsion along the x-axis if the obstacle does not contact the sensor uniformly. By positioning multiple composite sensors of the present disclosure in a ring near an inner surface of a pipe, with each of the composite sensors coupled to the same robotic device, it is possible to scan the entire pipe simultaneously as the robot passes along the length of the pipe. For example, a cropped composite sensor may replace blue sensing fins on a flow driven drone, which can be designed to measure the localized pressure gradient that a leak produces. The cropped composite sensor of the present disclosure has the advantages of, among other things, being linear, having minimal hysteresis, being able to decouple all four deformation forces, not requiring sensor fusion with an inertial measurement unit (IMU), and recording at over 250 Hz as compared to about 20 Hz. Furthermore, the bending angle from opposing pairs of composite sensors may be used to calculate the curvature of pipe joints as the robot passes through bends. In some instances, certain global properties like temperature can affect the dielectric constant of the composite sensors, in which case a composite sensor isolated from contact forces, e.g., a localized pressure gradient, can be used for calibration.

Composite sensors of the present disclosure can be waterproofed to allow use for underwater leak detection. This may be done, by way of non-limiting example, by placing the composite sensor in a mold and pouring Ecoflex 00-30 around the composite sensor. Such a technique can create a hermetic seal.

Figure 5:
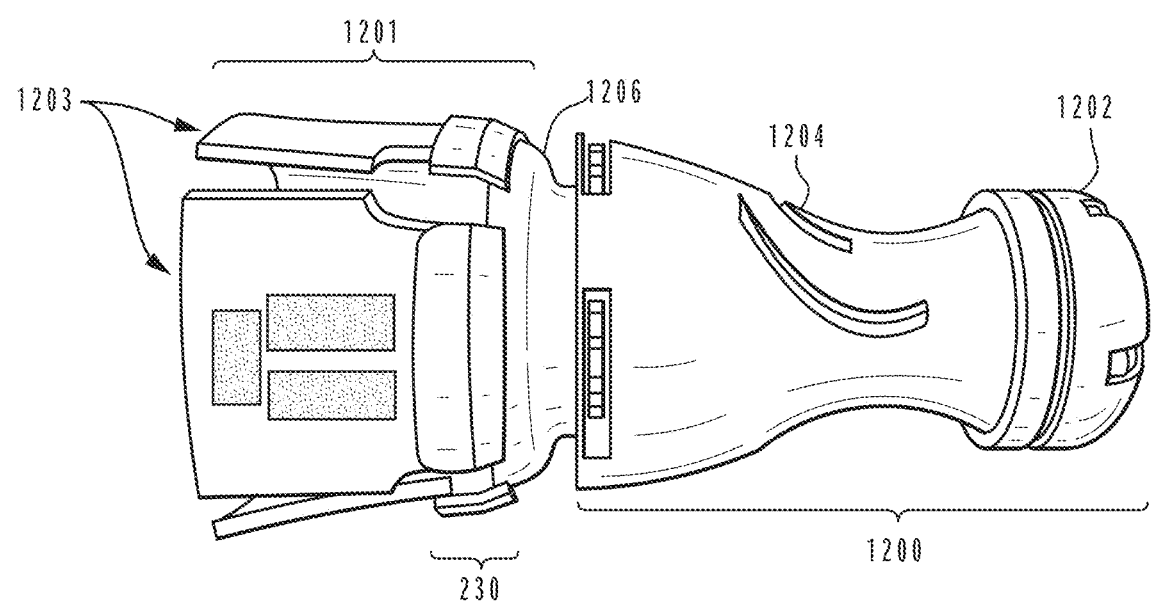
FIG. 5 illustrates one non-limiting embodiment of an in-pipe leak detection system that can be coupled to a flow-driven robot and can include one or more of the composite sensors of the present disclosure.

At least one example of a robot with which the disclosed sensors can be used, or that can be adapted to allow for the disclosed sensors can be used, includes the robots described in U.S. Pat. No. 10,845,007 to Wu et al., entitled "In-Pipe Leak Detection Systems, Devices, and Methods." FIGS. 5-6B illustrate one example of an in-pipe leak detection system that can be coupled to a flow-driven robot and can include one or more of the composite sensors 100, 20 of the present disclosure. FIG. 5 illustrates one embodiment of an in-pipe leak detection system 1201 coupled to a flow-driven robot or drone 1200. For example, the flow driven robot 1200 may include a pipeline inspection gauge (PIG) for transporting the leak detection system 1201 through a pipeline. The leak detection system 1201 can include a plurality of composite sensors 1203, such as those described above in connection with FIGS. 1-4E, with one edge of each composite sensor 1203 constrained by a support structure 230 of the leak detection system. With a flow-driven robot, the system 1201 may be transported through the pipeline at the speed of the flow. For example, in some embodiments, the speed of the fluid flow may be approximately 0.1 m/s and greater. As shown, the flow-driven robot 1200 may include a cap 1202 and a soft body portion 1204 made of rubber. The soft body portion 1204 may facilitate, for example, the ability of the robot to turn through elbows in the pipeline without getting stuck. In some embodiments, the soft body of the flow-driven robot 1200 may be configured to house one of more of a processor, memory, a position encoder, an IMU, a network communications processor, and a power supply. The flow-driven robot 1200 may be coupled to a base portion 1206 of the support structure 230, such that the wires or other leads from the plurality of composite sensors 1203 may be coupled to the processor.

Figure 6A:
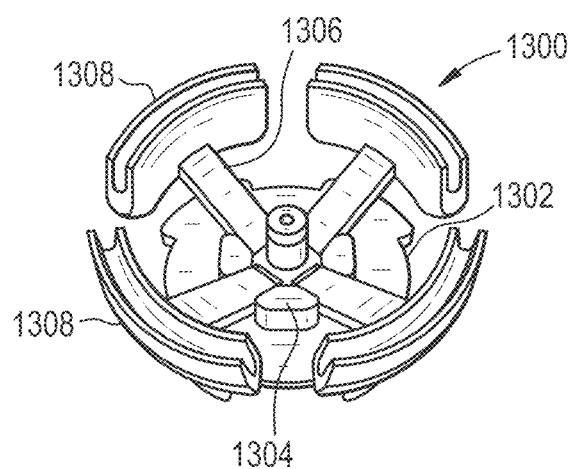
FIG. 6A illustrates one embodiment of a support structure for the in-pipe leak detection system of FIG. 5, the support structure having four radially extending support arms configured to receive one or more composite sensors provided for in the present disclosure, such as the composite sensor provided for in FIGS. 1 and/or 2A.
Figure 6B:
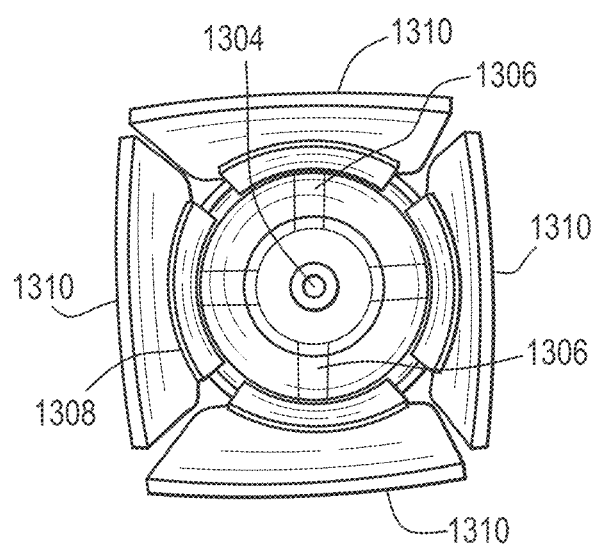
FIG. 6B illustrates one exemplary embodiment of the support structure of FIG. 6A configured to couple four composite unit sensors of the present disclosure thereto.

FIG. 6A illustrates one exemplary embodiment of the support structure 1300 for the in-pipe leak detection systems that can be used in conjunction with composite sensors of the present disclosure (e.g., FIG. 5). As shown, the support structure 1300 includes a base 1302, a hub 1304, four radially extending support arms 1306, and four rigid slot structures 1308. In the illustrated embodiment, the base 1302 has a substantially circular shape, although many other shapes are possible. The hub 1304 may be centrally disposed on the inner face of the base 1302. The four support arms 1306 may be coupled to the common hub 1304 and extend radially away from the hub 1304. Each of the radially extending support arms 1306 may be coupled at a terminal end to one of the four rigid support structures 1308. The arms 1306 can be used to attach respective composite sensors (e.g., 100, 200, 1201) to the support structure 1300. Each of the four rigid slot structures 1308 extend substantially perpendicular to the base 1302 so that the composite sensors (not shown) may be positioned substantially parallel to or in-align with an axial direction of the fluid flow. Each of the rigid slot structures 1308 may have an arcuate shape so that the rigid slot structures may form a circular array for conforming and/or adapting to the circumference of an inner wall of a pipe. Although four support arms 1306 and slot structures 1308 are shown, more or less may be used depending, at least in part, on the number of membranes being used for detecting fluid leaks, among other factors.

FIG. 6B illustrates one exemplary embodiment of the support structure of FIG. 6A attached to four composite sensors 1310 of the present disclosure. As shown, each of the four composite sensors 1310 is disposed in a respective one of the rigid slot structures 1308. The four membranes 1310 extend substantially perpendicular relative to the base 1302 such that the leak a first surface of the composite sensor with unit sensors disposed thereon (e.g., first surface 202a, containing unit sensors 1, 3, and 5, of the composite sensor 200 of FIG. 2A) may face the inner wall. FIG. 6B shows four composite sensors 1310 being used to substantially cover the entire circumference of a pipe such that the membranes may detect leaks in each of the four quadrants of a pipe circumference. However, more than four membranes, or membranes of different sizes and configurations, can be used to divide the pipe circumference into more or less than four quadrants, thereby enabling the system to more precisely locate the radial position of a leak within a pipe circumference. Further, in some embodiments, additional membranes can be layered on either or both sides of the membrane faces or behind the membranes in the axial direction of the fluid flow to help close any openings formed between adjacent membranes.

Some other non-limiting examples of robots with which the disclosed sensors may be able to be used, or that may be able to be adapted to allow for the disclosed sensors to be used, include the robots described in U.S. Pat. No. 8,869,599 to Ben-Mansour et al, entitled "Leak Detection System Based on Force Transduction," U.S. Pat. No. 9,285,290 to Chatzigeorgiou et al., entitled "Leak Detection Apparatus," U.S. Pat. No. 9,321,466 to Choi et al., entitled "Controllable Normal Force Mechanism with Minimum Energy Consumption," U.S. Pat. No. 9,335,233 to Khalifa et al., entitled "In-Pipe Leak Detection Based on Pressure Gradient," U.S. Pat. No. 10,078,031 to Youcef-Toumi et al., entitled "Compliant Leak Detection System," and U.S. Pat. No. 10,451, 210 to Wu et al, entitled "Soft Body Robot for In-Pipe Missions."

Extension to Other Fields

The composite sensors of the present disclosure can be useful in applications beyond leak detection. For example, robot prehension is an area that can benefit from increased geometric modeling, as the decoupled measurements of the sensor can be used to determine both the curvature of grasped objects, as well as the contact surface pressure. The torsion axis can provide additional information related to the shape of the object.

This sensor can also be useful in wearable technology, particularly around human joints with multiple bending modes, like the wrist, shoulder, or hip. This can enable high frequency measurements of the dynamic joint angle while minimizing the physical resistance for the user.

Three Sensor Embodiment

Figure 7:
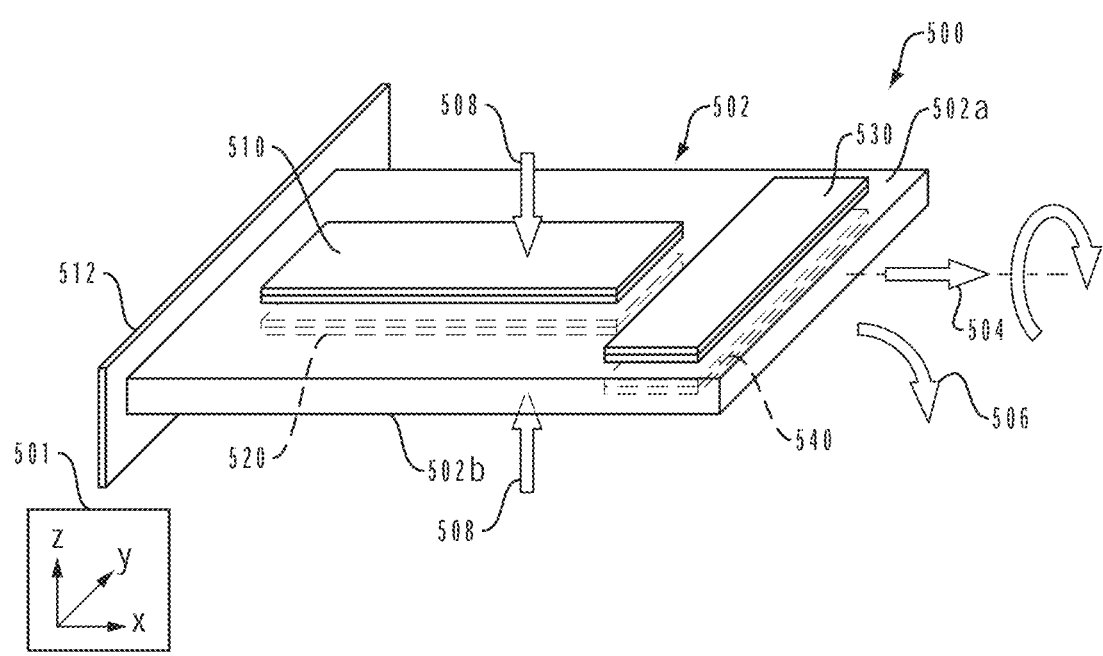
FIG. 7 is a perspective view of yet another exemplary embodiment of a composite sensor.

FIG. 7 illustrates another embodiment of a composite sensor 500 that can be formed from a substrate 502 with at least three unit sensors disposed thereon. In the illustrated embodiment, a first and third unit sensor 510, 530 can be disposed on a first surface 502a of the substrate 502 and a second and fourth unit sensor 520, 540 can be disposed on a second surface 502b of the substrate, substantially opposed to the first and third unit sensors 510, 530, respectively. The unit sensors 510, 520, 530, 540 can be placed in a particular arrangement such that the composite sensor 500 can detect and decouple three modes of deformation (with reference to the coordinate system 501): tension along an x-axis 504; bending along a y-axis 506, compression along a z-axis 508, which can include four unit sensors 510, 520, 530, 540 disposed on a substrate 502. For example, the unit sensors 510, 520, 530, 540 can be placed in a "T" configuration. With such a configuration, tension along the x-axis 504 can cause unit sensors 510, 520 to respond strongly, while unit sensors 520, 540—disposed on the substrate 502 in an orientation transverse to and, in some embodiments, substantially perpendicular to, the x-axis of the substrate—can respond weakly. Bending along the y-axis can cause unit sensors 510, 520 to curve or bend the most, as compared to unit sensors 530, 540. Accordingly, the first and second unit sensors 510, 520 respond strongly with opposite signs. The third and fourth unit sensors 530, 540 can respond similarly to the first and second unit sensors 510, 520, but to a lesser degree because the third and fourth unit sensors bend over a smaller arclength. Uniform compression along the z-axis 508 can subject each unit sensor 510, 520, 530, 540 to the same strain, so all unit sensors behave uniformly in response to such compression. While the fourth unit sensor 540 is included in the illustrated configuration, e.g., for structural integrity, symmetry, etc., the fourth unit sensor is redundant. Accordingly, a composite sensor with only the first, second, and third unit sensors 510, 520, 530 can successfully detect and decouple tension 504, bending 506, and compression 508. The composite sensor 500 can be constrained along one edge 512 of the substrate 502, as described above. The composite sensor 500 and unit sensors 510, 520, 530, 540 can be formed in accordance with the techniques described above.

Examples of the above-described embodiments can include the following:

1. A composite sensor, comprising:
   a substrate having opposed first and second surfaces, the substrate being constrained along a first edge of the substrate;
   a first unit sensor disposed on the first surface of the substrate;
   a second unit sensor disposed on the second surface of the substrate, the second unit sensor being disposed substantially opposed to the first unit sensor;
   a third unit sensor disposed on the first surface of the substrate, the third unit sensor having a longitudinal axis that is substantially perpendicular to a longitudinal axis of the first unit sensor;
   a fourth unit sensor disposed on the second surface of the substrate, the fourth unit sensor being disposed substantially opposed to the third unit sensor and having a longitudinal axis that is substantially perpendicular to a longitudinal axis of the second unit sensor;
   a fifth unit sensor disposed on the first surface of the substrate, the fifth unit sensor having a longitudinal axis that is substantially parallel to the longitudinal axis of the first unit sensor; and
   a sixth unit sensor disposed on the second surface of the substrate, the sixth unit sensor being disposed substantially opposed to the fifth unit sensor and having a longitudinal axis that is substantially parallel to the longitudinal axis of the second unit sensor;
   wherein the composite sensor exhibits four deformation modes that are decoupled from each other, the four deformation modes comprising: tension along an x-axis of the substrate, compressive force along a z-axis of the substrate, bending about a y-axis of the substrate, and torsion about the x-axis of the substrate.

2. The composite sensor of claim 1, wherein at least one of the first unit sensor, the second unit sensor, the third unit sensor, the fourth unit sensor, the fifth unit sensor, and the sixth unit sensor comprises a capacitive sensor.

3. The composite sensor of claim 2, wherein the capacitive sensor comprises a capacitive fabric sensor.

4. The composite sensor of claim 3, wherein the capacitive fabric sensor comprises a dielectric layer having a first conductive fabric disposed on a first side of the dielectric layer and a second conductive fabric opposed to the first conductive fabric on a second opposed side of the dielectric layer.

5. The composite sensor of any of claims 2 to 4, wherein each of the first unit sensor, the second unit sensor, the third unit sensor, the fourth unit sensor, the fifth unit sensor, and the sixth unit sensor comprises a capacitive sensor.

6. The composite sensor of any of claims 1 to 5, wherein the substrate is substantially more elastic than each of the first unit sensor, the second unit sensor, the third unit sensor, the fourth unit sensor, the fifth unit sensor, and the sixth unit sensor.

7. The composite sensor of any of claims 1 to 6,
   wherein a first midline of the substrate substantially bisects a main body of each of the first, second, fifth, and sixth unit sensors, and
   wherein a second midline of the substrate is substantially perpendicular to the first midline and substantially bisects a main body of each of the third and fourth unit sensors, with the main bodies of the first and second unit sensors being disposed on one side of the second midline and the main bodies of the fifth and sixth unit sensors being disposed on an opposite side of the second midline.

8. The composite sensor of any of claims 1 to 7, wherein the substrate has a substantially dogbone configuration.

9. A leak detection robot, comprising:
   a soft body; and
   at least one composite sensor that is at least one of coupled to or disposed on the soft body, the at least one composite sensor comprising:
   a substrate having opposed first and second surfaces;
   a first unit sensor being disposed on the first surface of the substrate;
   a second unit sensor disposed on the second surface of the substrate, the second unit sensor being disposed substantially opposed to the first unit sensor;
   a third unit sensor disposed on the first surface of the substrate, the third unit sensor having a longitudinal axis that is substantially perpendicular to a longitudinal axis of the first unit sensor; and
   a fourth unit sensor disposed on the second surface of the substrate, the fourth unit sensor being disposed substantially opposed to the third unit sensor and having a longitudinal axis that is substantially perpendicular to a longitudinal axis of the second unit sensor,
   wherein the composite sensor exhibits four deformation modes, the four deformation modes comprising: tension along an x-axis of the substrate, compressive force along a z-axis of the substrate, bending about a y-axis of the substrate, and torsion about the x-axis of the substrate.

10. The robot of claim 9, wherein at least one of the first unit sensor, the second unit sensor, the third unit sensor, and the fourth unit sensor comprises a capacitive sensor.

11. The robot of claim 10, wherein the capacitive sensor comprises a capacitive fabric sensor.

12. The robot of claim 11, wherein the capacitive fabric sensor comprises a dielectric layer having a first conductive fabric disposed on a first side of the dielectric layer and a second conductive fabric disposed opposed to the first conductive fabric on a second opposed side of the dielectric layer.

13. The robot of any of claims 10 to 12, wherein each of the first unit sensor, the second unit sensor, the third unit sensor, and the fourth unit sensor comprises a capacitive sensor.

14. The robot of any of claims 10 to 13, wherein the at least one composite sensor further comprises:
   a fifth unit sensor disposed on the first surface of the substrate, the fifth unit sensor having a longitudinal axis that is substantially parallel to the longitudinal axis of the first unit sensor; and
   a sixth unit sensor disposed on the second surface of the substrate, the sixth unit sensor being disposed substantially opposed to the fifth unit sensor and having a longitudinal axis that is substantially parallel to the longitudinal axis of the second unit sensor,
   wherein the four deformation modes are decoupled from each other.

15. The robot of claim 14,
   wherein a first midline of the substrate substantially bisects a main body of each of the first, second, fifth, and sixth unit sensors, and
   wherein a second midline of the substrate is substantially perpendicular to the first midline and substantially bisects a main body of each of the third and fourth unit sensors, with the main bodies of the first and second unit sensors being disposed on one side of the second midline and the main bodies of the fifth and sixth unit sensors being disposed on an opposite side of the second midline.

16. The robot of any of claims 9 to 15, wherein the substrate has a substantially dogbone configuration.

17. The robot of any of claims 9 to 16, further comprising an end cap coupled to the soft body.

18. A method for detecting leaks, comprising:
   disposing a flow-driven robot into a pipe, the flow-driven robot including at least one composite sensor for detecting leaks;
   measuring tension along an x-axis of the composite sensor;
   measuring compressive force along a z-axis of the composite sensor;
   measuring bending about a y-axis of the composite sensor;
   measuring torsion about the x-axis of the composite sensor; and
   determining an existence of a leak in the pipe based on at least one of the measured tension, the compressive force, the bending, and the torsion,
   wherein each of the measured tension, compressive force, bending, and torsion are decoupled from each other.

19. The method of claim 18, wherein the composite sensor is constrained along a first edge thereof.

20. The method of claim 18 or claim 19, wherein the composite sensor comprises any of the composite sensors of claims 1 to 17.

One skilled in the art will appreciate further features and advantages of the disclosure based on the above-described embodiments. Accordingly, the disclosure is not to be limited by what has been particularly shown and described, except as indicated by the appended claims. All publications and references cited herein are expressly incorporated herein by reference in their entirety.

What is claimed is:

1. A composite sensor, comprising:
   a substrate having opposed first and second surfaces, the substrate being constrained along a first edge of the substrate;
   a first unit sensor disposed on the first surface of the substrate, the first unit sensor being defined between a first terminal end and a second terminal end;
   a second unit sensor disposed on the second surface of the substrate, the second unit sensor being defined between a first terminal end and a second terminal end, and disposed substantially opposed to the first unit sensor such that the first terminal ends and the second terminal ends are aligned with one another along at least the x-axes and y-axes of the substrate;
   a third unit sensor disposed on the first surface of the substrate, the third unit sensor having a longitudinal axis that is substantially perpendicular to a longitudinal axis of the first unit sensor;
   a fourth unit sensor disposed on the second surface of the substrate, the fourth unit sensor being disposed substantially opposed to the third unit sensor and having a longitudinal axis that is substantially perpendicular to a longitudinal axis of the second unit sensor;
   a fifth unit sensor disposed on the first surface of the substrate, the fifth unit sensor having a longitudinal axis that is substantially parallel to the longitudinal axis of the first unit sensor; and
   a sixth unit sensor disposed on the second surface of the substrate, the sixth unit sensor being disposed substantially opposed to the fifth unit sensor and having a longitudinal axis that is substantially parallel to the longitudinal axis of the second unit sensor;
   wherein the composite sensor exhibits four deformation modes that are decoupled from each other, the four deformation modes comprising: tension along an x-axis of the substrate, compressive force along a z-axis of the substrate, bending about a y-axis of the substrate, and torsion about the x-axis of the substrate, and
   wherein at least one of the first unit sensor, the second unit sensor, the third unit sensor, the fourth unit sensor, the fifth unit sensor, or the sixth unit sensor comprises a capacitive sensor.

2. The composite sensor of claim 1, wherein the capacitive sensor comprises a capacitive fabric sensor.

3. The composite sensor of claim 2, wherein the capacitive fabric sensor comprises a dielectric layer having a first conductive fabric disposed on a first side of the dielectric layer and a second conductive fabric opposed to the first conductive fabric on a second opposed side of the dielectric layer.

4. The composite sensor of claim 1, wherein each of the first unit sensor, the second unit sensor, the third unit sensor, the fourth unit sensor, the fifth unit sensor, and the sixth unit sensor comprises a capacitive sensor.

5. The composite sensor of claim 1, wherein the substrate is substantially more elastic than each of the first unit sensor, the second unit sensor, the third unit sensor, the fourth unit sensor, the fifth unit sensor, and the sixth unit sensor.

6. The composite sensor of claim 1,
   wherein a first midline of the substrate substantially bisects a main body of each of the first, second, fifth, and sixth unit sensors, and wherein a second midline of the substrate is substantially perpendicular to the first midline and substantially bisects a main body of each of the third and fourth unit sensors, with the main bodies of the first and second unit sensors being disposed on one side of the second midline and the main bodies of the fifth and sixth unit sensors being disposed on an opposite side of the second midline.

7. The composite sensor of claim 1, wherein the substrate has a substantially dogbone configuration.

8. A leak detection robot, comprising:
a soft body; and
at least one composite sensor that is at least one of coupled to or disposed on the soft body, the at least one composite sensor comprising:
  a substrate having opposed first and second surfaces;
  a first unit sensor being disposed on the first surface of the substrate, the first unit sensor being defined between a first terminal end and a second terminal end;
  a second unit sensor disposed on the second surface of the substrate, the second unit sensor being defined between a first terminal end and a second terminal end, and disposed substantially opposed to the first unit sensor such that the first and second terminal ends are aligned with one another along at least the x-axes and y-axes of the substrate;
  a third unit sensor disposed on the first surface of the substrate, the third unit sensor having a longitudinal axis that is substantially perpendicular to a longitudinal axis of the first unit sensor; and
  a fourth unit sensor disposed on the second surface of the substrate, the fourth unit sensor being disposed substantially opposed to the third unit sensor and having a longitudinal axis that is substantially perpendicular to a longitudinal axis of the second unit sensor,
  wherein the composite sensor exhibits four deformation modes, the four deformation modes comprising: tension along an x-axis of the substrate, compressive force along a z-axis of the substrate, bending about a y-axis of the substrate, and torsion about the x-axis of the substrate, and
  wherein at least one of the first unit sensor, the second unit sensor, the third unit sensor, or the fourth unit sensor comprises a capacitive sensor.

9. The robot of claim 8, wherein the capacitive sensor comprises a capacitive fabric sensor.

10. The robot of claim 9, wherein the capacitive fabric sensor comprises a dielectric layer having a first conductive fabric disposed on a first side of the dielectric layer and a second conductive fabric disposed opposed to the first conductive fabric on a second opposed side of the dielectric layer.

11. The robot of claim 8, wherein each of the first unit sensor, the second unit sensor, the third unit sensor, and the fourth unit sensor comprises a capacitive sensor.

12. The robot of claim 8, wherein the at least one composite sensor further comprises:
  a fifth unit sensor disposed on the first surface of the substrate, the fifth unit sensor having a longitudinal axis that is substantially parallel to the longitudinal axis of the first unit sensor; and
  a sixth unit sensor disposed on the second surface of the substrate, the sixth unit sensor being disposed substantially opposed to the fifth unit sensor and having a longitudinal axis that is substantially parallel to the longitudinal axis of the second unit sensor,
  wherein the four deformation modes are decoupled from each other.

13. The robot of claim 12,
  wherein a first midline of the substrate substantially bisects a main body of each of the first, second, fifth, and sixth unit sensors, and
  wherein a second midline of the substrate is substantially perpendicular to the first midline and substantially bisects a main body of each of the third and fourth unit sensors, with the main bodies of the first and second unit sensors being disposed on one side of the second midline and the main bodies of the fifth and sixth unit sensors being disposed on an opposite side of the second midline.

14. The robot of any of claim 8, wherein the substrate has a substantially dogbone configuration.

15. The robot of any of claim 8, further comprising an end cap coupled to the soft body.

16. A method for detecting leaks, comprising:
disposing a flow-driven robot into a pipe, the flow-driven robot including at least one composite sensor for detecting leaks, the at least one composite sensor comprising:
  a substrate having opposed first and second surfaces,
  a first unit sensor being disposed on the first surface of the substrate, the first unit sensor being defined between a first terminal end and a second terminal end, and
  a second unit sensor disposed on the second surface of the substrate, the second unit sensor being defined between a first terminal end and a second terminal end, and disposed substantially opposed to the first unit sensor such that the first terminal ends and the second terminal ends are aligned with one another along at least the x-axes and y-axes of the substrate;
measuring tension along an x-axis of the composite sensor;
measuring compressive force along a z-axis of the composite sensor;
measuring bending about a y-axis of the composite sensor;
measuring torsion about the x-axis of the composite sensor; and
determining an existence of a leak in the pipe based on at least one of the measured tension, the compressive force, the bending, and the torsion,
wherein each of the measured tension, the measured compressive force, the measured bending, and the measured torsion are decoupled from each other, and
wherein at least one of the first unit sensor or the second unit sensor comprises a capacitive sensor.

17. The method of claim 16, wherein the composite sensor is constrained along a first edge thereof.

18. The method of claim 16, wherein the composite sensor comprises the composite sensor of claim 1.

19. The composite of claim 1, wherein the fourth unit sensor is aligned along at least the x-axes and y-axes of the substrate with the third unit sensor and the sixth unit sensor is aligned along at least the x-axes and y-axes of the substrate with the fifth unit sensor.

20. The robot of claim 8, wherein the fourth unit sensor is aligned along at least the x-axes and y-axes of the substrate with the third unit sensor.

21. The method of claim 16, wherein the at least one composite sensor further comprises:

a third unit sensor disposed on the first surface of the substrate, the third unit sensor having a longitudinal axis that is substantially perpendicular to a longitudinal axis of the first unit sensor; and a fourth unit sensor disposed on the second surface of the substrate, the fourth unit sensor being disposed substantially opposed to the third unit sensor such that they are aligned along at least the x-axes and y-axes of the substrate and having a longitudinal axis that is substantially perpendicular to a longitudinal axis of the second unit sensor.

* * * * *